(12) United States Patent
Solimano

(10) Patent No.: US 8,166,169 B2
(45) Date of Patent: Apr. 24, 2012

(54) METHOD OF ALLOCATING RESOURCES AMONG CLIENT WORK MACHINES

(75) Inventor: Marco Solimano, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 361 days.

(21) Appl. No.: 12/154,021

(22) Filed: May 20, 2008

(65) Prior Publication Data

US 2009/0007129 A1 Jan. 1, 2009

(30) Foreign Application Priority Data

Jun. 29, 2007 (EP) .................................. 07012780

(51) Int. Cl.
*G06F 15/173* (2006.01)
(52) U.S. Cl. ........................... 709/226; 700/99
(58) Field of Classification Search .................. 709/226; 700/99
See application file for complete search history.

(56) References Cited

U.S. PATENT DOCUMENTS

| | | | | |
|---|---|---|---|---|
| 5,603,029 A | * | 2/1997 | Aman et al. .................. | 718/105 |
| 6,104,962 A | * | 8/2000 | Sastry .............................. | 700/86 |
| 7,082,348 B1 | * | 7/2006 | Dahlquist et al. ............. | 700/128 |
| 2002/0178252 A1 | * | 11/2002 | Balabhadrapatruni et al. ............................. | 709/223 |
| 2003/0014500 A1 | * | 1/2003 | Schleiss et al. ............... | 709/218 |
| 2003/0144746 A1 | * | 7/2003 | Hsiung et al. .................. | 700/28 |
| 2003/0153994 A1 | * | 8/2003 | Jin et al. .......................... | 700/99 |
| 2008/0262824 A1 | * | 10/2008 | Oslake et al. ................... | 703/22 |

OTHER PUBLICATIONS

Tannenbaum et al.; "Beowulf Cluster Computing with Linux, Chapter 15, Condor—A Distributed Job Scheduler"; Retrieved from the Internet: http://www.cs.wisc.edu/condor/doc/beowulf-chapter-rev1.pdf; Oct. 18, 2007; University of Wisconsin-Madison.

* cited by examiner

*Primary Examiner* — Thomas Dailey

(74) *Attorney, Agent, or Firm* — Laurence A. Greenberg; Werner H. Stemer; Ralph E. Locher

(57) ABSTRACT

A method for allocating resources among a plurality of client work machines includes representing at least one client work machine as a resource object, representing at least one manufacturing process executable at a client work machine as a process, defining at least one usage capability for a resource object, selecting one of at least two states of the usage capability, and executing at least one manufacturing process on at least one client work machine according to the selected state of the usage capability.

5 Claims, 2 Drawing Sheets

METHOD OF ALLOCATING RESOURCES AMONG CLIENT WORK MACHINES

BACKGROUND OF THE INVENTION

The present invention relates to a method for resource allocation among a plurality of client work machines. Industrial automation has increased in scope and refinement with time. In general, industrial automation has focused on continuous processes comprising a plurality of interacting work machines. This covers in particular a broad range of manufacturing execution systems which are offered by the Siemens Corp. under its SIMATIC® product family. At least one remote client work machine close to the technical and/or logistical process is connected to at least one server across a communication network. A plurality of manufacturing processes is executable at the client work machines. The server is synchronized with the client work machines. The server hosts program applications and essential manufacturing data. The client work machines interact at different levels of system hierarchy. The manufacturing execution system represents an integrated workflow with a high complexity of processes, management and quality control.

The allocation of the resources at each client work machine is critical because resource allocation directly or indirectly affects the efficiency of the different interacting client work machines.

SUMMARY OF THE INVENTION

It is an object of the present invention to provide efficient resource allocation on the client work machines to achieve maximum utility of the manufacturing execution system throughout the integrated workflow.

Accordingly, one aspect involves a method for allocating resources among a plurality of client work machines. The method includes representing at least one client work machine as a resource object, representing at least one manufacturing process executable at a client work machine as a process, defining at least one usage capability for a resource object, selecting one of at least two states of the usage capability, and executing at least one manufacturing process on at least one client work machine according to the selected state of the usage capability.

Another aspect involves a computer-readable storage medium having stored thereon an information processing program for allocating resources among a plurality of client work machines to be executed on a computer, wherein the program includes the steps according to the above mentioned method when loaded in a digital processor of a computing device.

A further aspect involves a computer program product for allocating resources among a plurality of client work machines, the computer program product being embodied in a computer readable medium and comprising computer instructions for executing the above mentioned method.

It is an advantage of the invention that the state of the usage capability of a client work machine is easily selectable through representation of the client work machine as a resource object and representation of the manufacturing process as a process object. By doing so, engineering of resource allocations now comprises both, the physical entity and the logical component. The resource allocation of interacting client work machines which are linked to the same manufacturing process occurs then in a seamless way. It becomes thus possible to define at least one usage capability and to select one out of at least two states of the usage capability and to execute a manufacturing process on the client work machine according to the selected state of the usage capability.

Preferably, the selection of the state of the usage capability occurs on a graphical user interface.

Preferably, the selection of the state of the usage capability of a specific resource object occurs at a server and the selected state of the usage capability is transmitted to the client work machine corresponding to the specific resource object across a communication network.

Preferably, the selection of the state of the usage capability of a specific resource object occurs at a client work machine and a copy of the selected state of the usage capability is transmitted to the server across the communication network.

Preferably, the usage capability comprises a local state, where one process is executable at a time and a shared state, where up to a maximum number of processes are executable in parallel.

Preferably, the usage capability comprises a local-to-process state, where the process comprises a maximum number of process segments, which are executable in a serial order.

Preferably, the usage capability comprises a global state, where an unlimited number of processes is executable in parallel.

BRIEF DESCRIPTION OF THE SEVERAL VIEWS OF THE DRAWINGS

Preferred examples of the invention are described hereinafter with reference to the figures, wherein.

DETAILED DESCRIPTION OF THE INVENTION

Figure 1:
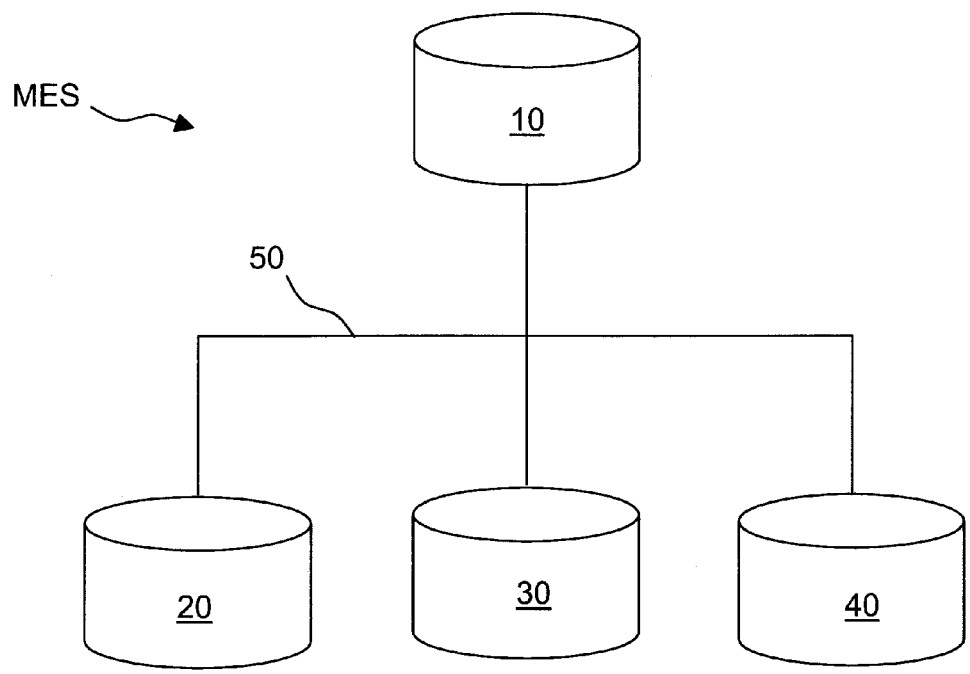
FIG. 1 is a schematic representation of the manufacturing execution system with a server which is connected with a plurality of client work machines across a communication network.

As schematically shown by FIG. 1, a plurality of client work machines or plant objects 20, 30, 40 is locally or globally distributed. The manufacturing execution system S comprises at least one server 10 and a plurality of computers at each client work machine 20, 30, 40. Server 10 and each computer comprise at least one processor, at least one memory and a plurality of input/output devices like SECS/GEM interfaces for enabling a communication across a communication network 50. The server 10 and the computers are managed by at least one operating system. Preferably, the operating system is a graphical user interface based operating system like Microsoft Windows or Mac OS X. At least one computer program product is foreseen, which computer program product carries a computer program adapted to perform the method for resource allocation among the plurality of client work machines 20, 30, 40. The computer program product may be stored in a computer readable medium carrying the computer program adapted to perform the method for resource allocation among the plurality of client work machines 20, 30, 40. The communication network 50 may be a standard telecommunication network enabling communication by means of a standard network protocol like the Internet Protocol, PROFIBUS or PROFInet. Server 10 acts as master within the manufacturing execution system S, and the server 10 hosts program applications and essential manufacturing data.

Figure 2:
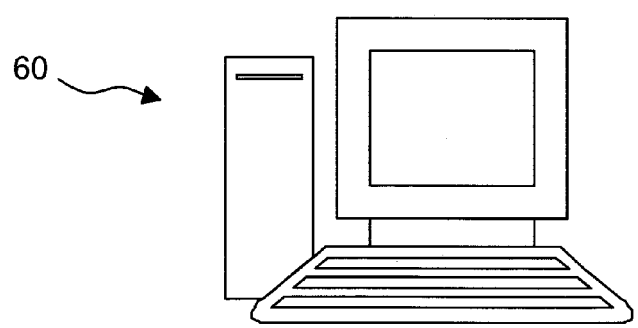
FIG. 2 is a schematic representation of a graphical user interface of the manufacturing execution system according to FIG. 1.

FIG. 2 shows a graphical user interface (GUI) 60 of the manufacturing execution system MES. The graphical user interface 60 is operated either directly on the server 10 or on a computer at a client work machine 20, 30, 40. The graphical user interface 60 comprises a screen as output device. The visible graphical elements on said screen are used to interact with a computer program adapted to perform the method for resource allocation among the plurality of client work machines 20, 30, 40. Common graphical elements which usually act as a user-input tool are: windows, buttons, menus, and scroll bars. The graphical elements are functionally independent from and indirectly linked to computer program functionality, so the graphical user interface 60 can be easily customized.

Figure 3:
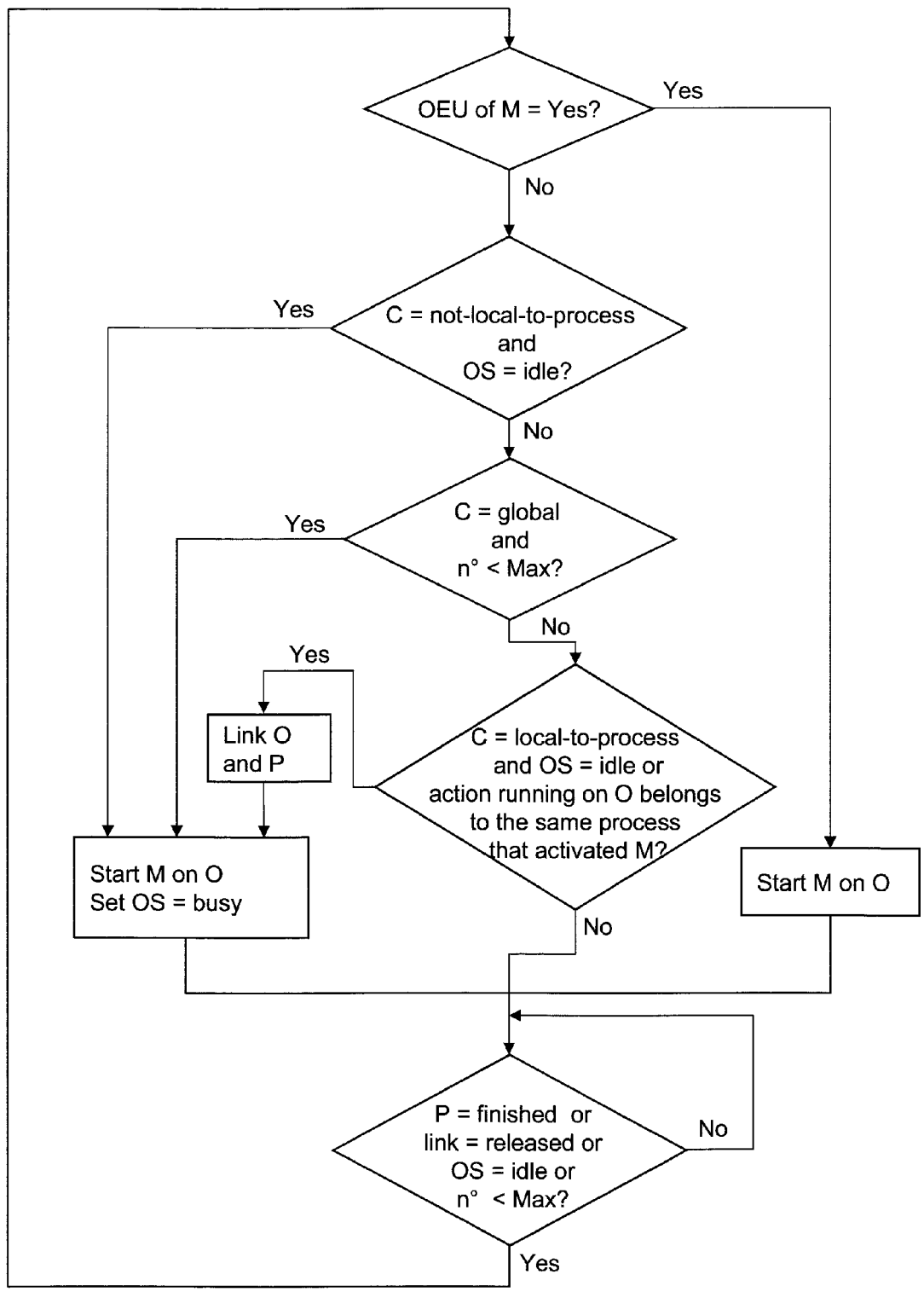
FIG. 3 is a schematic flowchart representation of the method for resource allocation among the plurality of client work machines of the manufacturing execution system according to FIG. 1.

FIG. 3 is a schematic flowchart representation of the method for resource allocation among the plurality of client work machines 20, 30, 40. In the flowchart a resource object or plant object O represents one client work machine 20, 30, 40.

The method for resource allocation may comprise two classes:

The first class is called in the following "process object". The class process object is the top level class from which all plant object classes, e.g. mixer, reactor, and production line, are derived.

The second class is called in the following "method", which represents the functionality assigned to the class of process objects, e.g. mix, react, or produce.

The class process object comprises an attribute called "equipment usage capability C" or short usage capability C. This attribute C may take one of the following values:

C=local: This means, that the plant object O can only execute one action at the given time; in other words, while an action is running on the plant object O, all other actions scheduled must wait until the first one finishes.

C=shared: in this case, the plant object O can concurrently perform more than one action. Optionally, it can be specified the maximum number Max of actions that can be executed in parallel on the plant object O. Once the maximum number Max is reached, all other actions wait until one of the running ones finishes. By default, an indefinite number of actions can be executed in parallel.

C=local-to-process: This is an hybrid mode, which is useful to "reserve" plant objects for the execution of something in advance. By selecting this modality, as soon as a plant object executes an action, it becomes linked to the process, e.g. the process segment, that has started that action. From now on, all actions belonging to the same process can be executed, while actions belonging to other processes must wait until the link is released. The link is released when the process ends or when it is decided manually via a dedicated runtime Graphics Device Interface (GDI), or programmatically with a dedicated logical action in the process, that the plant object should be released.

C=global: For compatibility with existing systems that don't comprise the attribute equipment usage capability C, the default value (assigned during upgrade to existing plant objects, too) is C=global, with an indefinite number of concurrent actions, which is the current objects behavior.

In the following two approaches or embodiments are described for the remainder of the data structure, depending on the level of granularity desired for the allocation method, and implementation difficulties. Nevertheless, these two approaches are not mutually exclusive: more, they can be implemented step-by-step, which foresees a simple solution in a first step, and its extension in a second one.

In a first embodiment of the method for resource allocation the class method comprises an attribute called "override equipment usage" or short OEU and the application comprises a global option.

The value of the attribute OEU can be either Yes, No, or Default. If nothing is specified, the value of the attribute OEU is Default.

If the value of OEU is Default, the value of the global option is considered, which can be either Yes or No (the default value is YES).

If the value of OEU is Yes, this means that equipment usage capabilities C are not taken into account when executing that method M on the specified plant object O.

If the value of OEU is No, the equipment usage capability C of the plant object O is considered while scheduling the method M (see flow diagram in FIG. 3).

In a second embodiment of the method for resource allocation the class method comprises an attribute called "category", which represents the kind of action to be executed on one of the plant objects, e.g., logical control, arbitration, or real action.

The class plant object may comprise an attribute called "usage by categories". This attribute is a list of couple of values: a category and an equipment usage, e.g., [logical action: global], or [real action:local-to-process]. If this attribute is not used, the above described attribute override equipment usage OEU may serve as default: it will be used when an action not belonging to the listed categories is invoked.

With the help of these attributes, each of the above mentioned classes will inherit the listed changes, as prescribed by the Object Oriented Analysis (OOA).

M is a method to be executed on a specified plant object O and P is the process, which activates the method M. OS is the object status of the resource object O and may be set on "OS=idle" or on "OS=busy".

For any client work machine 20, 30, 40, the selection of the state of the usage capability C of a specific resource object O can occur either at the server 10 and the s elected state of the usage capability C of the resource object O is then transmitted across the communication network 50 to the client work machine 20, 30, 40 corresponding to this resource object O; or, the selection of the state of the usage capability C of a specific resource object O occurs at the client work machine 20, 30, 40 corresponding to this resource object O and a copy of the selected state of the usage capability C is transmitted to the server 10 across the communication network 50. The selection of the state of the usage capability C occurs by means of graphical elements of the graphical user interface 60. The man skilled in the art may of course select a state of the usage capability C for a specific resource object O at any client work station 20, 30, 40 of the manufacturing execution system S and transmit a copy of the selected state of the usage capability C to both, the server 10 and the client work machine 20, 30, 40 corresponding to this resource object O across the communication network 50.

The default state "OEU=Yes" of attribute override equipment usage OEU may be necessary, if the server 10 or client work machine 20, 30, 40 does not permit a state selection. According to the flowchart of FIG. 3, if the value of the attribute override equipment usage OEU is Yes "OEU=Yes" for the corresponding manufacturing method M, then this manufacturing method M is started by the process P on resource object O "Start M on O".

Otherwise, the value of the attribute override equipment usage OEU is No, this means that the result of the query "OEU=Yes?" is logically false, and the following steps are processed.

If the value of the attribute usage capability C is not-local-to-process "C=not-local-to-process" and the object status OS of the plant object O is idle "OS=idle", then the manufacturing method M is started on the resource object O "Start M on O" and the object status OS of the plant object O is set to busy "Set OS=busy". Otherwise the next query is processed.

If the value of the attribute usage capability C is global "C=global" and the actual count $n^o$ of actions running on plant object O is smaller than the maximum allowed number Max "$n^o$<Max", then also the manufacturing method M is started on the resource object O "Start M on O" and the object status OS of the plant object O is set to busy "Set OS=busy". Otherwise the next query is processed.

If the value of the attribute usage capability C is local-to-process "C=local-to-process" and the object status OS of the plant object O is idle "OS=idle" or the action running on the plant object O belongs to the same process P that activated the method M, then the plant object O is linked to the process P "Link O to P", the manufacturing method M is started on the resource object O "Start M on O", and the object status OS of the plant object O is set to busy "Set OS=busy".

Otherwise, it is waited until one of the following conditions is fulfilled: The process P has been finished, or the plant object O has been released from the process P, or the plant object O becomes idle, or the number $n^o$ of actions running on the plant object O is smaller than the maximum allowed number Max.

According to the flowchart of FIG. 3 the scheduling is repeated, if one of the above mentioned conditions is logically true "Yes".

Upon selection of the local state of the usage capability C, only one process object P is executable at a time at the corresponding client work machine 20, 30, 40. Upon selection of the shared state of the usage capability C, up to a maximum number Max "$n^o$<Max" of process objects P are executable in parallel at the corresponding client work machine 20, 30, 40.

Upon selection of the local-to-process state "C=local-to-process" of the usage capability C, the process comprises a maximum number Max "$n^o$<Max" of process segments PS, whereby the process segments PS are executable in a serial order at the corresponding client work machine 20, 30, 40. The selection of the local-to-process state for a resource object O sets a link between the resource object O and the serial of process segments PS.

Finally, upon selection of the global state of the usage capability C, an unlimited number of processes P is executable in parallel at the corresponding client work machine 20, 30, 40.

Having illustrated and described a preferred embodiment for a novel method for resource allocation among a plurality of client work machines, it is noted that variations and modifications in the method can be made without departing from the spirit of the invention or the scope of the appended claims.

What is claimed is:

1. A method of allocating resources among a plurality of client work machines, comprising:
   representing at least one client work machine as a resource object;
   representing at least one manufacturing process executable at a client work machine as a process;
   defining at least one usage capability for the resource object;
   selecting a state of the usage capability from a list of definable usage capabilities which includes:
      a local state, where one process is executable at a time,
      a shared state, where up to a maximum number of processes are executable in parallel,
      a local-to-process state, where only one process is executable at a time and the process includes a maximum number of process segments that are executable in a serial order, and
      a global state in which an unlimited number of process objects are executable in parallel; and
   executing at least one manufacturing process on at least one client work machine according to the selected state of the usage capability.

2. The method of claim 1, wherein the selection of the state of the usage capability occurs on a graphical user interface.

3. The method of claim 1, wherein the selection of the state of the usage capability of a specific resource object occurs at a server, and wherein the selected state of the usage capability is transmitted to the client work machine corresponding to the specific resource object across a communication network.

4. The method of claim 1, wherein the selection of the state of the usage capability of a specific resource object occurs at a client work machine, and wherein a copy of the selected state of the usage capability is transmitted to a server across the communication network.

5. A non-transitory computer-readable storage medium having stored thereon an information processing program for allocating resources among a plurality of client work machines to be executed on a computer, causing the computer to execute a method comprising:
   representing at least one client work machine as a resource object;
   representing at least one manufacturing process executable at a client work machine as a process;
   defining at least one usage capability for the resource object;
   selecting a state of the usage capability from a list of definable usage capabilities which includes:
      a local state, where one process is executable at a time,
      a shared state, where up to a maximum number of processes are executable in parallel,
      a local-to-process state, where only one process is executable at a time and the process includes a maximum number of process segments that are executable in a serial order, and
      a global state in which an unlimited number of process objects are executable in parallel; and
   executing at least one manufacturing process on at least one client work machine according to the selected state of the usage capability.

* * * * *